(12) United States Patent
Wu et al.

(10) Patent No.: US 7,817,433 B2
(45) Date of Patent: Oct. 19, 2010

(54) MOUNTING DEVICE

(75) Inventors: Chia-Kang Wu, Taipei Hsien (TW); Li-Ping Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 403 days.

(21) Appl. No.: 12/102,018

(22) Filed: Apr. 14, 2008

(65) Prior Publication Data

US 2009/0190316 A1 Jul. 30, 2009

(30) Foreign Application Priority Data

Jan. 24, 2008 (CN) .................... 2008 2 0300139 U

(51) Int. Cl.
*H05K 7/00* (2006.01)
(52) U.S. Cl. .................... 361/747; 361/801; 361/802
(58) Field of Classification Search ................ 361/801, 361/802, 740, 747, 732, 726, 679.01, 730, 361/752, 790, 797, 800, 807, 810, 688, 699, 361/700–701, 704, 715; 312/223.1, 223.2
See application file for complete search history.

(56) References Cited

U.S. PATENT DOCUMENTS

| | | | | |
|---|---|---|---|---|
| 5,544,006 A * | 8/1996 | Radloff et al. | ......... | 361/679.32 |
| 6,404,624 B1 * | 6/2002 | Jeong | .................... | 361/679.41 |
| 7,123,470 B2 * | 10/2006 | Hsu et al. | .............. | 361/679.02 |
| 7,499,285 B2 * | 3/2009 | Chen et al. | ................... | 361/752 |
| 7,724,538 B2 * | 5/2010 | Tsai et al. | .................... | 361/802 |
| 7,742,291 B2 * | 6/2010 | Wu et al. | ............... | 361/679.32 |
| 7,746,630 B2 * | 6/2010 | Tsai et al. | .............. | 361/679.32 |

* cited by examiner

*Primary Examiner*—Hung S Bui
(74) *Attorney, Agent, or Firm*—Frank R. Niranjan

(57) ABSTRACT

A mounting device includes a chassis, a transfer card electronically connected to a motherboard, and a mounting bracket assembly. The mounting bracket assembly includes a clamping member and a fastening member. The clamping member clamping a first end of the transfer card and restricting movement of the transfer card in a first direction. The fastening member fastening an opposite second end of the transfer card to restrict movement of the transfer card in a second direction perpendicular to the first direction.

14 Claims, 3 Drawing Sheets

MOUNTING DEVICE

BACKGROUND OF THE INVENTION

1. Field of the Invention

The present invention relates to mounting devices, particularly to a mounting device for mounting a transfer card.

2. Description of Related Art

With the development of the information industry, various kinds of electronic devices are connected together to perform data exchange. However, different kinds of electronic devices usually have different transfer interfaces. The electronic devices cannot be connected together directly via the transfer interfaces. At this time, a transfer card is generally used for connecting the electronic devices together. Conventionally, the transfer card is mounted by a mounting bracket, the length of the mounting bracket is unchangeable, so this mounting bracket cannot mount different kinds of transfer cards that have different lengths.

What is needed, therefore, is a mounting device capable of mounting more than one kind of transfer card in an electronic device enclosure.

SUMMARY

A mounting device includes a chassis, a transfer card electronically connected to a motherboard, and a mounting bracket assembly. The mounting bracket assembly includes a clamping member and a fastening member. The clamping member clamping a first end of the transfer card and restricting movement of the transfer card in a first direction. The fastening member fastening an opposite second end of the transfer card to restrict movement of the transfer card in a second direction perpendicular to the first direction.

Other advantages and novel features of the present invention will become more apparent from the following detailed description of a preferred embodiment when taken in conjunction with the accompanying drawings, in which:

DETAILED DESCRIPTION OF THE EMBODIMENT

Figure 1:
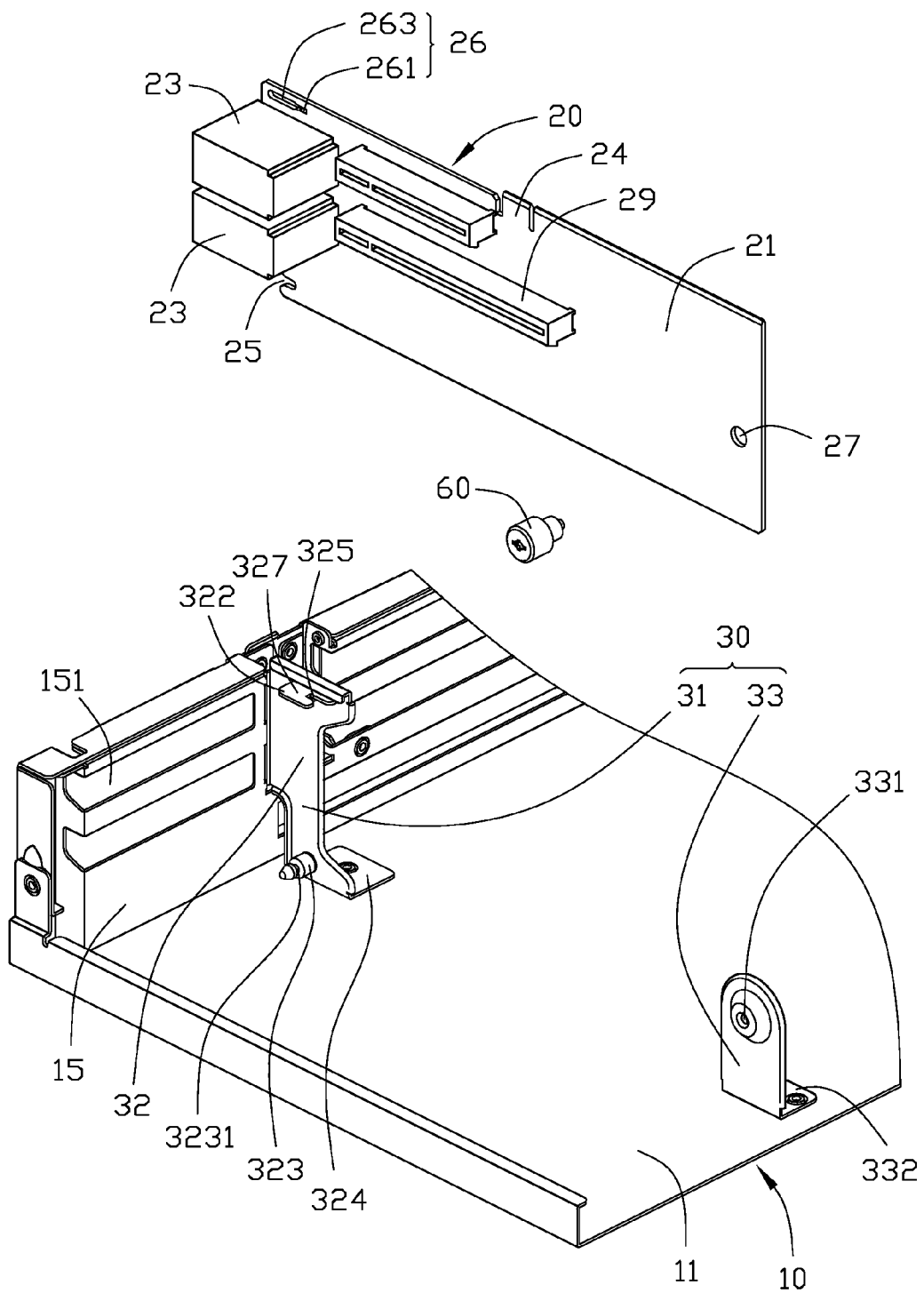
FIG. 1 is an exploded, isometric view of a mounting device in accordance with an exemplary embodiment, the mounting device including a chassis and a transfer card.
Figure 2:
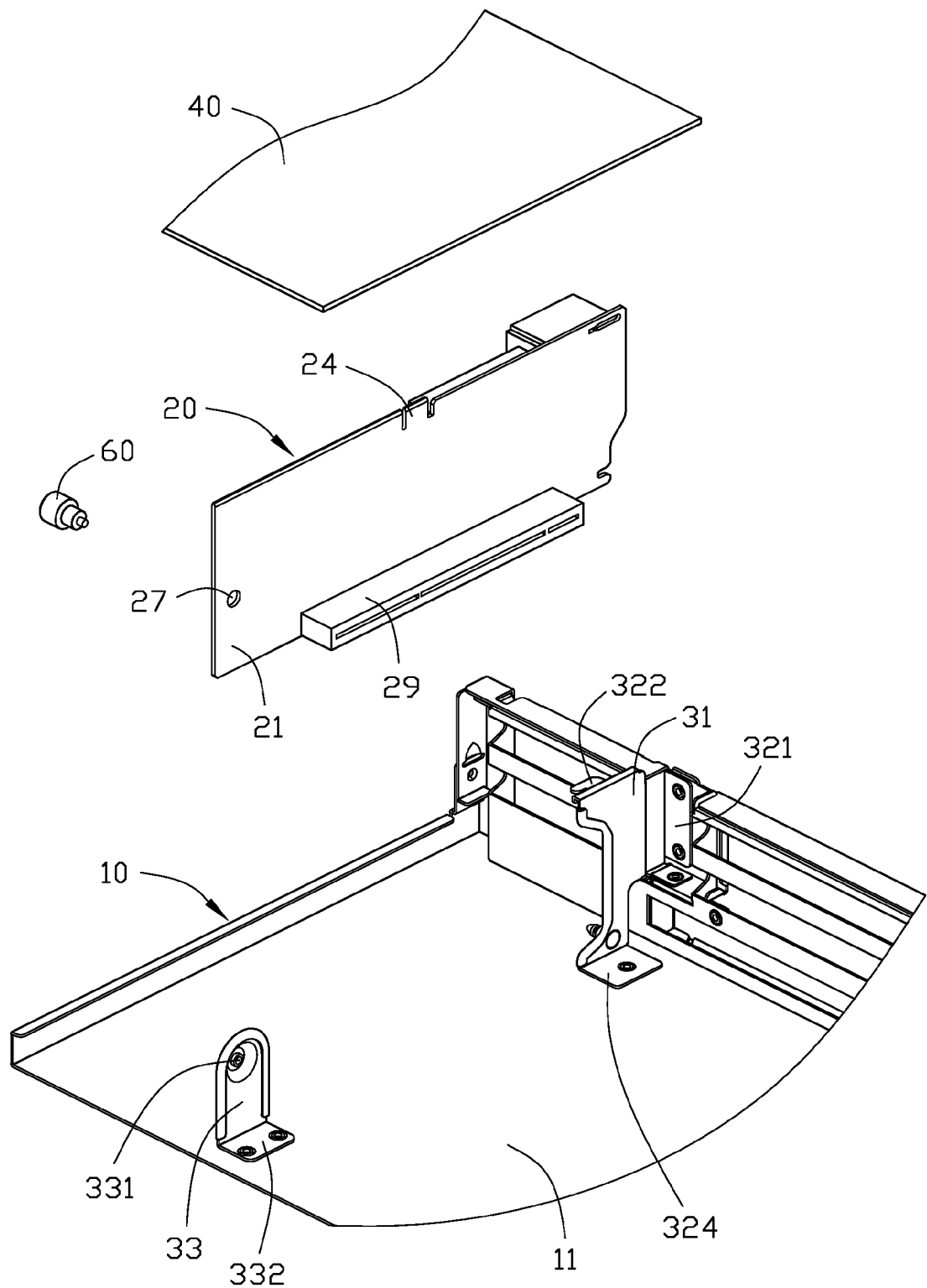
FIG. 2 is an another exploded view of FIG. 1.

Referring to FIG. 1 and FIG. 2, a mounting device, includes a chassis 10, a transfer card 20, and a mounting bracket assembly 30 for mounting the transfer card 20 to the chassis 10. The mounting bracket assembly 30 includes a clamping member 31 and a fastening member 33.

The chassis 10 includes a bottom wall 11 and a back wall 15 perpendicular to the bottom wall 11. The back wall 15 defines two slots 151 parallel to the bottom wall 11. The clamping member 31 and the fastening member 33 are oriented perpendicular and attached to the bottom wall 11.

The clamping member 31 has a main body 32, a flange 321 extending out from a top edge of the main body 32 abutting the back wall 15 of the chassis 10. The flange 321 defines two fastening holes. A post 323 is formed extending perpendicularly from a first surface of the clamping member 31 near and end thereof. A flange 324 horizontally extends out from a bottom edge of the main body 32 in a direction opposite to the post 322 and abuts against the bottom wall 15 of the chassis 10. The flange 324 has fasteners mounted therethrough. The post 323 defines a clamping flute 3231 at a middle portion thereof. A protrusion 322 extends out from the top of the first surface of the clamping member 31 in the same direction as the post 323. The protrusion 322 defines a recess 325 in a middle portion thereof. The protrusion 322 further includes a clamping portion 327. The fastening member 33 defines a securing hole 331 at a top end thereof. A flange 332 horizontally extends out from a bottom edge of the fastening member 33 and is mounted to the bottom wall 15 of the chassis 10. The flange 332 has two fasteners mounted therethrough.

The transfer card 20 is electronically connected to a motherboard 40 through a gold finger 24. The transfer card 20 includes a PCB (Printed Circuit Board) 21. The PCB 21 has two connection ports 23 at a first end thereof. A clamping notch 25 is defined in the PCB 21 under the connection ports 23 corresponding to the clamping flute 3231 of the post 323 of the clamping member 31. A groove 26 is defined in the PCB 21 above the connection ports 23 corresponding to the protrusion 322 of the clamping member 31. The groove 26 includes a receiving groove 263 for receiving the protrusion 322 and a clamping groove 261 for clamping the clamping portion 327 of the protrusion 322. The receiving groove 263 communicates with the clamping groove 261. Width and length of the receiving groove 263 are greater than that of the clamping groove 261. The PCB 21 defines a securing hole 27 at a second end thereof opposite to the first end corresponding to the securing hole 331 of the fastening member 33. The PCB 21 further includes at least one transfer connecting port 29 at two opposite for receiving at least one extension card.

Figure 3:
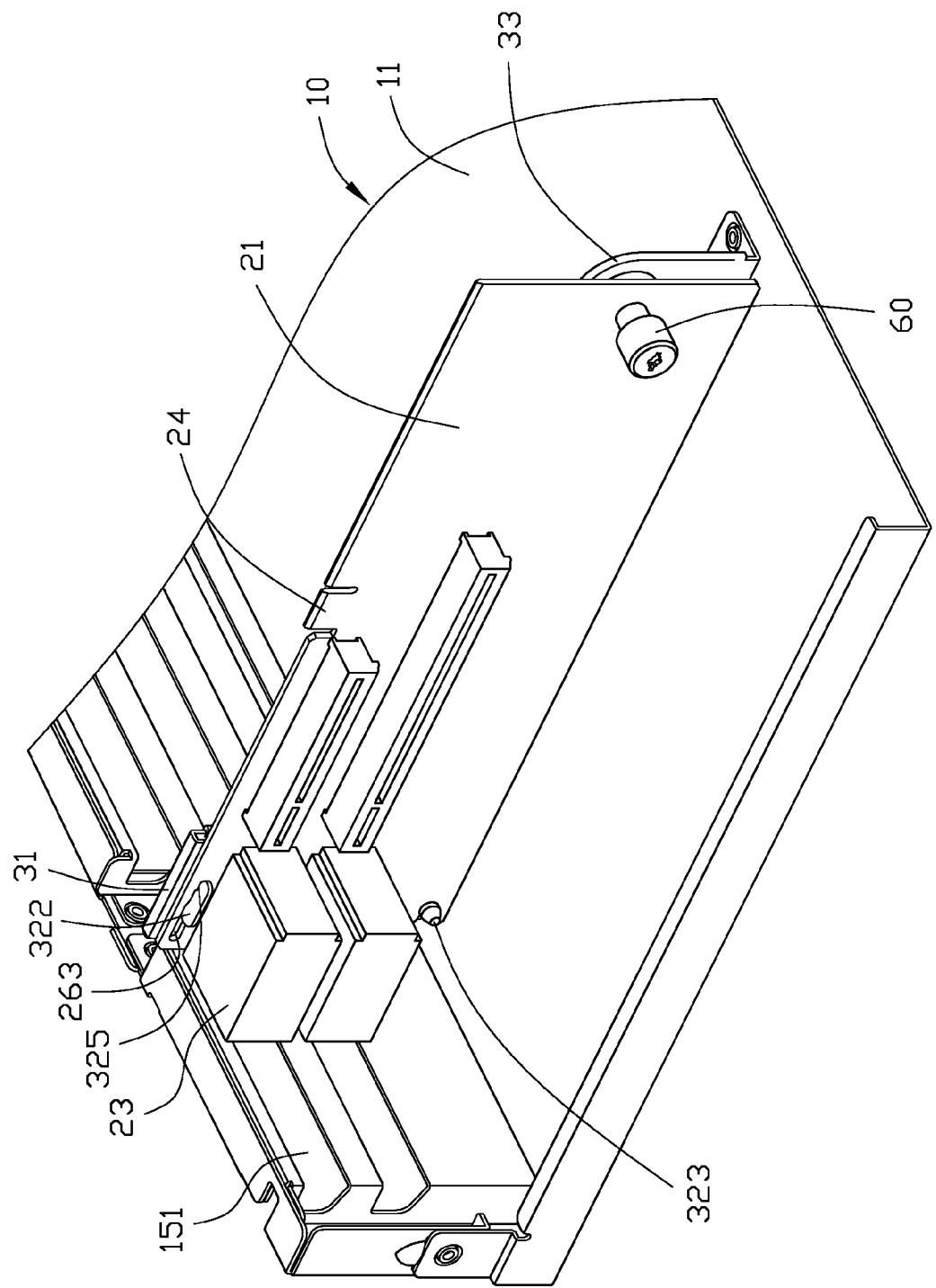
FIG. 3 is an assembled, isometric view of FIG. 1.

Referring to FIG. 3, in assembly, the clamping member 31 and the fastening member 33 are fastened to the chassis 10. The groove 26 and the clamping notch 25 of the transfer card 20 abut against the protrusion 322 and the post 323 of the clamping member 31. The transfer card 20 is positioned so that the clamping notch 25 of the transfer card 20 engages with the clamping flute 3231 of the post 323 of the clamping member 31. The clamping groove 261 of the groove 26 engages the clamping portion 327 of the protrusion 322 of the clamping member 31. At this time, the clamping member 31 restricts movement of the transfer card 20 in a first direction. The securing hole 27 of the transfer card 20 abuts against the securing hole 331 of the fastening member 33. A screw 60 is inserted into the securing hole 27 of the transfer card 20 and the securing hole 331 of the fastening member 33 to restrict movement of the transfer card 20 in a second direction perpendicular to the first direction. To replace the transfer card 20, the screw 60 is loosened to disengage from the transfer card 20, which can then be removed. Other similar transfer cards, but having different lengths, can also be mounted by the mounting bracket assembly 30.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting device, comprising:
   a chassis;
   a transfer card electronically connected to a motherboard, and the transfer card comprising a transfer connecting port at opposite sides thereof for receiving extension cards; and
   a mounting bracket assembly for mounting the transfer card to the chassis, the mounting bracket assembly comprising a clamping member and a fastening member spaced from the clamping member, the clamping member and the fastening member being detachably mounted to the chassis, the clamping member clamping a first end of the transfer card and restricting movement of the transfer card in a first direction, the fastening member fastening an opposite second end of the transfer card to restrict movement of the transfer card in a second direction perpendicular to the first direction.

2. The mounting device as described in claim 1, wherein a protrusion extends out from the top of the clamping member, the protrusion includes a clamping portion, and a groove is defined in the transfer card for engagement with the protrusion.

3. The mounting device as described in claim 2, wherein the groove includes a receiving groove for receiving the protrusion and a clamping groove for engaging the clamping portion of the protrusion, the receiving groove communicates with the clamping groove, width and length of the receiving groove are greater than that of the clamping groove.

4. The mounting device as described in claim 2, wherein a post is formed extending perpendicularly from a first surface of the clamping member near an end thereof, the post defines a clamping flute at a middle portion thereof, a clamping notch is defined in the transfer card for engagement in the clamping flute of the post of the clamping member.

5. The mounting device as described in claim 4, wherein the protrusion protrudes in the same direction as the post.

6. The mounting device as described in claim 1, wherein a flange horizontally extends out from a bottom edge of the main body in a direction opposite to the post and abuts against the bottom wall of the chassis for mounting thereof, a flange horizontally extends out from a bottom edge of the fastening member for mounting the fastening member to the chassis.

7. A mounting device, comprising:
   a chassis;
   a transfer card defining a clamping notch and a securing hole; and
   a mounting bracket assembly for mounting the transfer card in the chassis, the mounting bracket assembly comprising a clamping member and a fastening member, a post formed at an end of the clamping member, the post defining a clamping flute at a middle portion thereof for engagement in the clamping notch of the transfer card, the fastening member defining a securing hole corresponding to the securing hole of the transfer card, the clamping member clamping a first end of the transfer card and restricting movement of the transfer card in a first direction, the fastening member fastening an opposite second end of the transfer card and restricting movement of the transfer card in a second direction perpendicular to the first direction.

8. The mounting device as described in claim 7, wherein a protrusion extends out from the top of the clamping member, the protrusion includes a clamping portion, and a groove is defined in the transfer card for engagement with the protrusion.

9. The mounting device as described in claim 8, wherein the groove includes a receiving groove for receiving the protrusion and a clamping groove for engaging the clamping portion of the protrusion, the receiving groove communicates with the clamping groove, width and length of the receiving groove are greater than that of the clamping groove.

10. The mounting device as described in claim 8, wherein the protrusion protudes in the same direction as the post.

11. The mounting device as described in claim 7, wherein a flange horizontally extends out from a bottom edge of the main body in a direction opposite to the post and abuts against the bottom wall of the chassis for mounting thereof, a flange horizontally extends out from a bottom edge of the fastening member for mounting the fastening member to the chassis.

12. The mounting device as described in claim 7, wherein a screw is inserted into the securing hole of the transfer card and the securing hole of the fastening member, thus mounting the transfer card on the fastening member.

13. The mounting device as described in claim 7, wherein the transfer card includes at least one transfer connecting port at opposite sides thereof for receiving extension cards.

14. A mounting device, comprising:
   a chassis having a bottom panel and a side panel extending perpendicularly from the bottom panel, the side panel having a slot defined therein;
   a motherboard parallel to the bottom panel
   a transfer card disposed between the motherboard and the bottom panel, the transfer card having a printed circuit board electronically connected to the motherboard, and an extension socket arranged on opposite sides of the printed circuit board for receiving extension cards at the opposite sides thereof, the printed circuit board being perpendicular to the bottom panel and comprising a transfer connecting port at opposite sides thereof; and
   a mounting bracket comprising a clamping member and a fastening member spaced from the clamping member, the clamping member clamping a first end of the transfer card and restricting movement of the transfer card in a first direction toward the side panel, the fastening member fastening an opposite second end of the transfer card to restrict movement of the transfer card in a second direction perpendicular to the first direction.

\* \* \* \* \*